(12) United States Patent
Kreft et al.

(10) Patent No.: US 9,772,617 B2
(45) Date of Patent: Sep. 26, 2017

(54) SYSTEMS AND METHODS FOR FUNCTION BLOCK INSTANTIATION

(75) Inventors: Dana Robert Kreft, Roanoke, VA (US); Robert William Grubbs, Roanoke, VA (US); Andre Steven DeMaurice, Salem, VA (US)

(73) Assignee: General Electric Company, Schenectady, NY (US)

( * ) Notice: Subject to any disclaimer, the term of this patent is extended or adjusted under 35 U.S.C. 154(b) by 821 days.

(21) Appl. No.: 13/174,539

(22) Filed: Jun. 30, 2011

(65) Prior Publication Data

US 2013/0006390 A1     Jan. 3, 2013

(51) Int. Cl.
    *G06F 9/44*     (2006.01)
    *G05B 19/05*     (2006.01)
    *G05B 19/418*     (2006.01)
    *G05B 15/02*     (2006.01)

(52) U.S. Cl.
    CPC ............ *G05B 19/056* (2013.01); *G05B 15/02* (2013.01); *G05B 19/4186* (2013.01); *G05B 2219/13101* (2013.01); *G06F 9/44* (2013.01)

(58) Field of Classification Search
    CPC .............. G06F 17/50; G06F 9/44–9/46; G05B 19/042; G05B 19/056; G05B 19/4186; G05B 15/02; G05B 2219/13101
See application file for complete search history.

(56) References Cited

U.S. PATENT DOCUMENTS

| | | | | |
|---|---|---|---|---|
| 5,801,942 A * | 9/1998 | Nixon | ................. | G05B 19/056 700/17 |
| 5,826,086 A * | 10/1998 | Arima et al. | ................. | 717/105 |
| 5,832,264 A * | 11/1998 | Hart | ........................ | G06F 9/465 719/316 |
| 5,980,078 A * | 11/1999 | Krivoshein et al. | .............. | 700/1 |
| 6,028,997 A * | 2/2000 | Leymann et al. | ............ | 717/104 |
| 6,445,962 B1 * | 9/2002 | Blevins et al. | ................. | 700/37 |
| 6,477,435 B1 * | 11/2002 | Ryan | ................. | G05B 19/0426 700/182 |
| 6,501,995 B1 * | 12/2002 | Kinney et al. | ................... | 700/1 |

(Continued)

FOREIGN PATENT DOCUMENTS

| | | | |
|---|---|---|---|
| CN | 101158869 A | 4/2008 | |
| CN | 101460909 A | 6/2009 | |

(Continued)

OTHER PUBLICATIONS

K. Thramboulidis et al., "Field Device Specification for the Development of Function Block Oriented Engineering Support Systems", [Online], IEEE 2001, pp. 581-587, [Retrieved from Interent on Mar. 7, 2017], <http://ieeexplore.ieee.org/stamp/stamp.jsp?arnumber=996417>.*

(Continued)

*Primary Examiner* — Ziaul A Chowdhury
(74) *Attorney, Agent, or Firm* — Fletcher Yoder, P.C.

(57) ABSTRACT

The embodiments described herein include a system and a method. In one embodiment, a system includes a library configured to store reusable executable control information and a substitution information. The system further includes a controller configured to instantiate the reusable executable control information in a memory and to associate the substitution information with a field device.

15 Claims, 5 Drawing Sheets

(56) References Cited

U.S. PATENT DOCUMENTS

| | | | |
|---|---|---|---|
| 6,754,885 B1* | 6/2004 | Dardinski | G05B 15/02 717/113 |
| 2003/0014387 A1* | 1/2003 | Kreidler | G05B 19/4183 |
| 2003/0023336 A1* | 1/2003 | Kreidler | G05B 19/4183 700/108 |
| 2003/0061274 A1* | 3/2003 | Lo | G05B 19/056 709/203 |
| 2003/0195639 A1* | 10/2003 | Nixon et al. | 700/19 |
| 2004/0059851 A1* | 3/2004 | Donaires | G05B 19/0423 710/104 |
| 2004/0194101 A1* | 9/2004 | Glanzer | G05B 15/02 718/100 |
| 2004/0220684 A1* | 11/2004 | Fukui | 700/18 |
| 2005/0085928 A1* | 4/2005 | Shani | G05B 19/056 700/18 |
| 2006/0020429 A1* | 1/2006 | Brooks et al. | 702/189 |
| 2006/0200256 A1* | 9/2006 | Mason | G05B 19/054 700/65 |
| 2007/0078956 A1* | 4/2007 | VanGompel | 709/220 |
| 2007/0142934 A1* | 6/2007 | Boercsoek | G05B 19/4185 700/23 |
| 2007/0280286 A1* | 12/2007 | Hodson et al. | 370/466 |
| 2007/0299907 A1* | 12/2007 | Deininger et al. | 709/203 |
| 2008/0091279 A1* | 4/2008 | Biermann et al. | 700/17 |
| 2008/0189526 A1* | 8/2008 | Sokolova et al. | 712/226 |
| 2009/0326683 A1* | 12/2009 | Gerstmaier | G05B 9/03 700/79 |
| 2010/0064297 A1* | 3/2010 | Doll | G05B 19/042 719/315 |
| 2010/0100654 A1* | 4/2010 | Ramsay | 710/100 |
| 2010/0123722 A1* | 5/2010 | Grubbs | G05B 19/0426 345/473 |
| 2010/0180279 A1* | 7/2010 | Yajima | G05B 19/056 718/103 |
| 2010/0217423 A1* | 8/2010 | Dingfelder et al. | 700/109 |
| 2010/0318740 A1* | 12/2010 | Guerrasio | 711/118 |
| 2011/0187490 A1* | 8/2011 | Nakamoto | G05B 19/418 340/3.9 |
| 2011/0202688 A1* | 8/2011 | Shah et al. | 710/5 |
| 2011/0271266 A1 | 11/2011 | Kreft et al. | |
| 2011/0313547 A1* | 12/2011 | Hernandez | G05B 19/042 700/23 |
| 2012/0306658 A1* | 12/2012 | Karaffa | G05B 19/4186 340/679 |
| 2012/0310373 A1* | 12/2012 | Karaffa | G05B 19/4186 700/11 |

FOREIGN PATENT DOCUMENTS

| | | |
|---|---|---|
| CN | 102890453 A | 6/2013 |
| EP | 2261805 A1 | 12/2010 |
| WO | 9836335 A2 | 8/1998 |

OTHER PUBLICATIONS

Henrik Dibowski et al., "Ontology-Based Device Descriptions and Triple Store Based Device Repository for Automation Devices", [Online], IEEE 2010, pp. 1-9, [Retrieved from Internet on Mar. 7, 2017], <http://ieeexplore.ieee.org/stamp/stamp.jsp?arnumber=5641257>.*

Thomas G. Foster et al., "Human Machine Interface Programming and Testing", [Online], Kennedy Space Center 2013, pp. 1-9, [Retrieved from Internet on Mar. 7, 2017], <https://ntrs.nasa.gov/archive/nasa/casi.ntrs.nasa.gov/20140002621.pdf>.*

Martin Wollschlaeger et al., "Web-based Information System for Life Cycle Support of Fieldbus Devices", [Online], IEEE 2005, pp. 895-902, [Retrieved from Internet on Mar. 7, 2017], <http://ieeexplore.ieee.org/stamp/stamp.jsp?arnumber=1612767>.*

Office Action from China Trade Mark Office mailed on Nov. 4, 2015 for patent Application No. 201210375501.9.

* cited by examiner

| NAME | DESCRIPTION | VALUE |
|---|---|---|
| DEVICE | ENTER DEVICE NAME (EX 102TI1000 OR 1ILAC10CT0DI) | {DEVICE} |
| DESC | ENTER DEVICE DESCRIPTION | AI DESCRIPTION |
| FormatSp | ENTER FORMAT SPECIFICATION | TempFS |
☐ ENTER THE ATTRIBUTE INSTANCE VALUES
[OK] [CANCEL]
FIG. 4
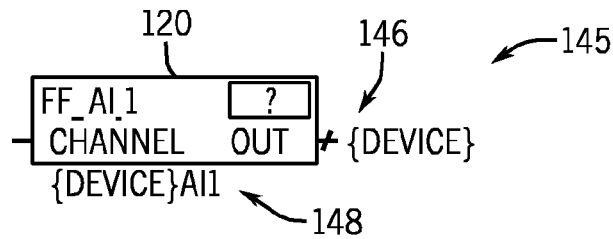
FIG. 5
☐ ENTER THE ATTRIBUTE INSTANCE VALUES
| NAME | DESCRIPTION | VALUE |
|---|---|---|
| DEVICE | THE DEVICE TAG FOR THE TASK | FFAI1000 |
[OK] [CANCEL]
FIG. 6
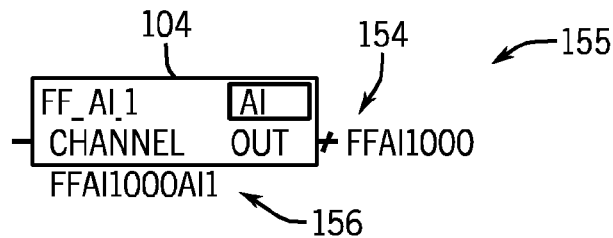
FIG. 7

SYSTEMS AND METHODS FOR FUNCTION BLOCK INSTANTIATION

BACKGROUND OF THE INVENTION

The subject matter disclosed herein relates to the instantiation of systems, and more specifically, to the instantiation of function blocks.

Certain systems, such as industrial control systems, may provide for control capabilities that enable the execution of computer instructions in various types of devices, such as sensors, pumps, valves, and the like. For example, function blocks may be used to encapsulate control logic in the various devices. However, the function blocks may be created by different manufacturers. Accordingly, configuring and/or programming the multiple devices may be complex and time consuming.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a library configured to store reusable executable control information and a substitution information. The system further includes a controller configured to instantiate the reusable executable control information in a memory and to associate the substitution information with a field device.

In a second embodiment, a method includes defining, via a computer of a system, a reusable control information in a library. The method further includes instantiating the reusable control information in a controller. The method also includes substituting an attribute included in the reusable control information with field device information included in a field device.

In a third embodiment, a non-transitory tangible computer-readable medium including executable code is provided. The executable code includes instructions for defining, via a computer of a system, a reusable control information in a library. The executable code further includes instructions for instantiating the reusable control information in a controller as an executable control logic. The executable code also includes instructions for substituting an attribute included in the reusable control information with field device information included in a field device.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 4 is a screen view of an embodiment of a grid control suitable for entering library information;

FIG. 5 is a screen view of an embodiment of a reusable, generic function block;

FIG. 6 is a screen view of an embodiment of a grid control useful in entering field device information;

FIG. 7 is a screen view of an embodiment of an instantiated function block based on the reusable, generic function block of FIG. 8;

DETAILED DESCRIPTION OF THE INVENTION

Figure 1:
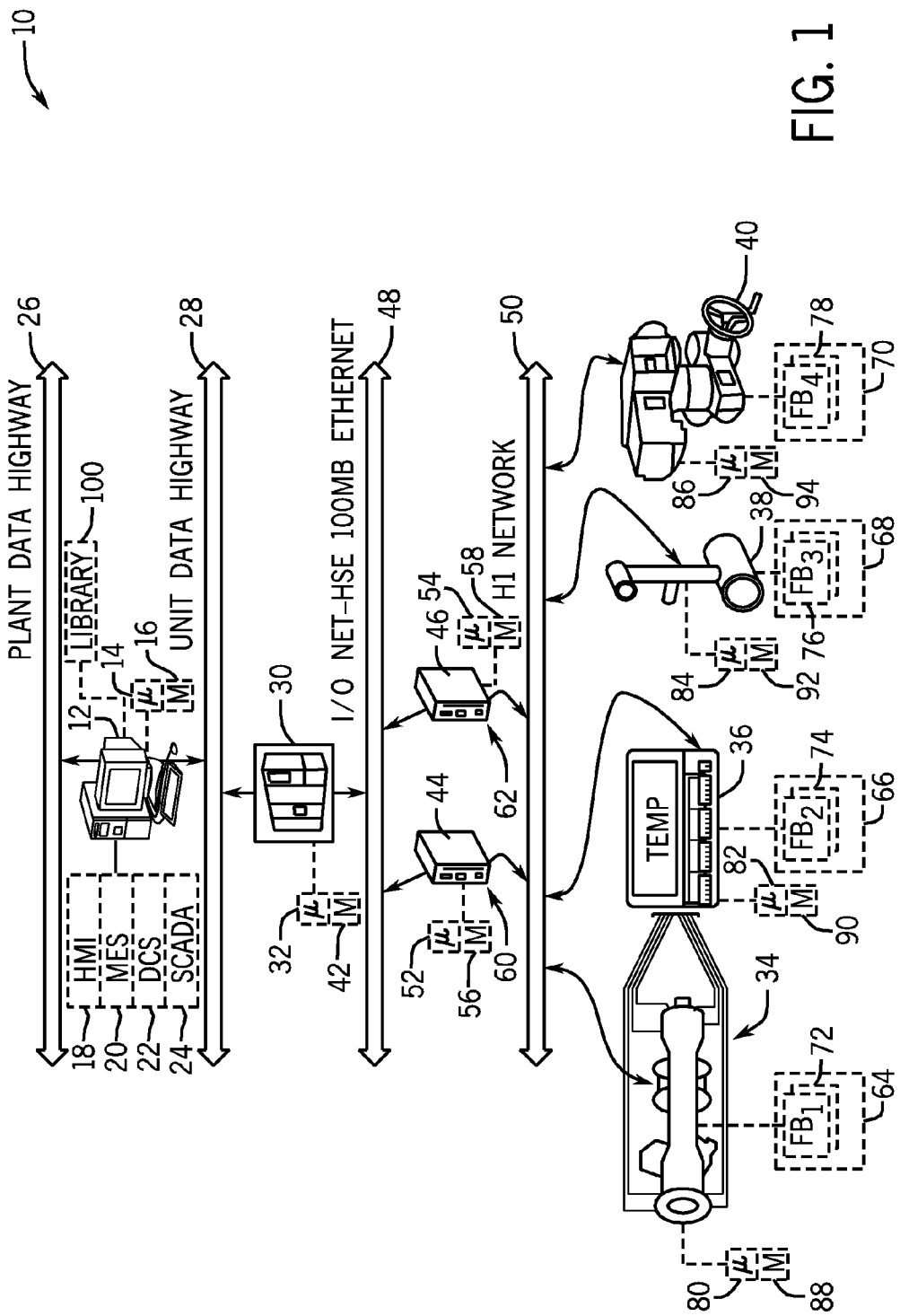
FIG. 1 is a schematic diagram of an embodiment of an industrial control system, including a library.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Industrial control systems may include controller systems suitable for interfacing with a variety of field devices, such as sensors, pumps, valves, and the like. For example, sensors may provide inputs to the controller system, and the controller system may then derive certain actions in response to the inputs, such as actuating the valves, driving the pumps, and so on. In certain controller systems, such as the Mark™ VIe controller system, available from General Electric Co., of Schenectady, N.Y., multiple field devices may be communicatively coupled to and controlled by a controller. Indeed, multiple controllers may be controlling multiple field devices, as described in more detail with respect to FIG. 1 below. The devices communicatively connected to the controller may include field devices, such as Fieldbus Foundation devices, that include support for the Foundation H1 bi-directional communications protocol. Accordingly, the devices may be communicatively connected with the controller in various communication segments, such as H1 segments, attached to linking devices, to enable a plant-wide network of devices.

Each field device may include computer instructions or control logic encapsulated in function blocks. For example, a proportional-integral-derivative (PID) function block may include PID instructions suitable for implementing a closed-loop control of certain processes, such as industrial processes. Likewise, an Analog Input (AI) function block and an Analog Output (AO) function block may be used to retrieve input data and to submit output data, respectively.

Indeed, various types of function blocks may be provided that can include a variety of computer instructions or control logic, as described in more detail below with respect to FIG. 1. Each function block may then be instantiated or loaded into memory of the field device for use in a control loop. The field device may then execute the computer instructions or control logic in the instantiated function block.

The function block instantiation may use certain values, such as a device identification, calibration values, and logic variables (e.g., programming variables). A control engineer or commissioning engineer may manually enter the values used by each of the function blocks. However, the industrial control system may include hundreds and sometimes thousands of field devices. Entering certain values across multiple devices may be time consuming and inefficient.

The systems and methods disclosed herein enable automatic insertion of block instantiation information. Indeed, an attribute substitution technique may be used, as described in more detail below, to automatically insert library information into function blocks executable across a wide variety of devices in the industrial control system, including Fieldbus Foundation devices. The devices may be provided by a variety of manufacturers and may include any number of function block information, such as device identification information, Fieldbus Foundation function block information, and manufacturer-specific function block information. Additionally, the systems and methods disclosed herein enable a user, such as a controls engineer or commissioning engineer, to store and update attribution substitution information by using the library as described in more detail below. The library may include a hierarchical storage structure suitable for efficiently storing, finding, and manipulating device-related information. Further, the instantiation information may be provided prior to actual device instantiation. That is, the systems and methods disclosed herein may enable the user to manipulate the library information prior to actual instantiation to aid in preparing a desired device configuration, and may store the desired device configuration prior to the actual connection of the field devices to an industrial process control system, such as the industrial process control system described in more detail below with respect to FIG. 1. Once the field devices are connected to the industrial process control system, then the stored device configuration may be used to instantiate the function blocks in the field devices. In this way, configuring the field devices may be performed more efficiently. By providing for reusable process control information, the field devices, the controller, and the industrial process control system may be more easily configured and managed.

Turning to FIG. 1, an embodiment of an industrial process control system 10 is depicted. The control system 10 may include a computer system 12 suitable for executing a variety of field device configuration and monitoring applications, and for providing an operator interface through which an engineer or technician may monitor the components of the control system 10. Accordingly, the computer 12 includes a processor 14 that may be used in processing computer instructions, and a memory 16 that may be used to store computer instructions and other data. The computer system 12 may include any type of computing device suitable for running software applications, such as a laptop, a workstation, a tablet computer, or a handheld portable device (e.g., personal digital assistant or cell phone). Indeed, the computer system 12 may include any of a variety of hardware and/or operating system platforms. In accordance with one embodiment, the computer 12 may host an industrial control software, such as a human-machine interface (HMI) software 18, a manufacturing execution system (MES) 20, a distributed control system (DCS) 22, and/or a supervisor control and data acquisition (SCADA) system 24. The HMI 18, MES 20, DCS 22, and/or SCADA 24 may be stored as executable code instructions on non-transitory tangible computer readable media, such as the memory 16 of the computer 12. For example, the computer 12 may host the ControlST™ software, available from General Electric Co., of Schenectady, N.Y.

Further, the computer system 12 is communicatively connected to a plant data highway 26 suitable for enabling communication between the depicted computer 12 and other computers 12 in the plant. Indeed, the industrial control system 10 may include multiple computer systems 12 interconnected through the plant data highway 26. The computer system 12 may be further communicatively connected to a unit data highway 28, suitable for communicatively coupling the computer system 12 to an industrial controller 30. The industrial controller 30 may include a processor 32 suitable for executing computer instructions or control logic useful in automating a variety of plant equipment, such as a turbine system 34, a temperature sensor 36, a valve 38, and a pump 40. The industrial controller 30 may further include a memory 42 for use in storing, for example, computer instructions and other data. The industrial controller 30 may communicate with a variety of field devices, including but not limited to flow meters, pH sensors, temperature sensors, vibration sensors, clearance sensors (e.g., measuring distances between a rotating component and a stationary component), pressure sensors, pumps, actuators, valves, and the like. In some embodiments, the industrial controller 30 may be a Mark™ VIe controller system, available from General Electric Co., of Schenectady, N.Y.

In the depicted embodiment, the turbine system 34, the temperature sensor 36, the valve 38, and the pump 40 are communicatively connected to the industrial controller 30 by using linking devices 44 and 46 suitable for interfacing between an I/O network 48 and an H1 network 50. For example, the linking devices 44 and 46 may include the FG-100 linking device, available from Softing AG, of Haar, Germany. As depicted, the linking devices 44 and 46 may include processors 52 and 54, respectively, useful in executing computer instructions, and may also include memory 56 and 58, useful in storing computer instructions and other data. In some embodiments, the I/O network 48 may be a 100 Megabit (MB) high speed Ethernet (HSE) network, and the H1 network 50 may be a 31.25 kilobit/second network. Accordingly, data transmitted and received through the I/O network 48 may in turn be transmitted and received by the H1 network 50. That is, the linking devices 44 and 46 may act as bridges between the I/O network 48 and the H1 network 50. For example, higher speed data on the I/O network 48 may be buffered, and then transmitted at suitable speed on the H1 network 50. Accordingly, a variety of field devices may be linked to the industrial controller 30 and to the computer 12. For example, the field devices 34, 36, 38, and 40 may include or may be industrial devices, such as Fieldbus Foundation devices that include support for the Foundation H1 bi-directional communications protocol. The field devices 34, 36, 38, and 40 may also include support for other communication protocols, such as those found in the HART® Communications Foundation (HCF) protocol, and the Profibus Nutzer Organization e.V. (PNO) protocol.

Each of the linking devices 44 and 46 may include one or more segment ports 60 and 62 useful in segmenting the H1 network 42. For example, the linking device 44 may use the segment port 60 to communicatively couple with the devices 34 and 36, while the linking device 46 may use the segment port 62 to communicatively couple with the devices 38 and 40. Distributing the input/output between the field devices 34, 36, 38, and 40, by using, for example, the segment ports 60 and 62, may enable a physical separation useful in maintaining fault tolerance, redundancy, and improving communications time.

Each field device 34, 36, 38, and 40 may include a respective device description (DD) file, such as the depicted DD files 64, 66, 68, and 70. The DD files 64, 66, 68, and 70 may be written in a device description language (DDL), such as the DDL defined in the International Electrotechnical Commission (IEC) 61804 standard. In some embodiments, the files 64, 66, 68, and 70 are tokenized binary files. That is, the DD files 64, 66, 68, and 70 may include data formatted in a tokenized binary format useful in reducing the size of the DD files 64, 66, 68, and 70. The DD files 64, 66, 68, and 70 may each include one or more function blocks 72, 74, 76, and 78. The function blocks 72, 74, 76, and 78 may include computer instructions or computer logic executable by processors 80, 82, 84, and 86. Indeed, the function blocks 72, 74, 76, and 78 may be instantiated into memory 88, 90, 92, 94, and then executed by the processors 80, 82, 84, and 86, respectively. In this way, the field devices 34, 36, 38, and 40 may contribute control logic and other computer instructions towards the execution of processes in the industrial process control system 10. Advantageously, the systems and methods disclosed herein provide the user (e.g., control engineer or commissioning engineer) with a library 100 suitable for storing, manipulating, and disseminating information to the field devices 34, 36, 38, and 40. For example, reusable instantiation information may be provided to the field devices 34, 36, 38, and 40, thus enabling a more efficient configuration of the field devices 34, 36, 38, and 40, as described in more detail below with respect to FIG. 2.

Figure 2:
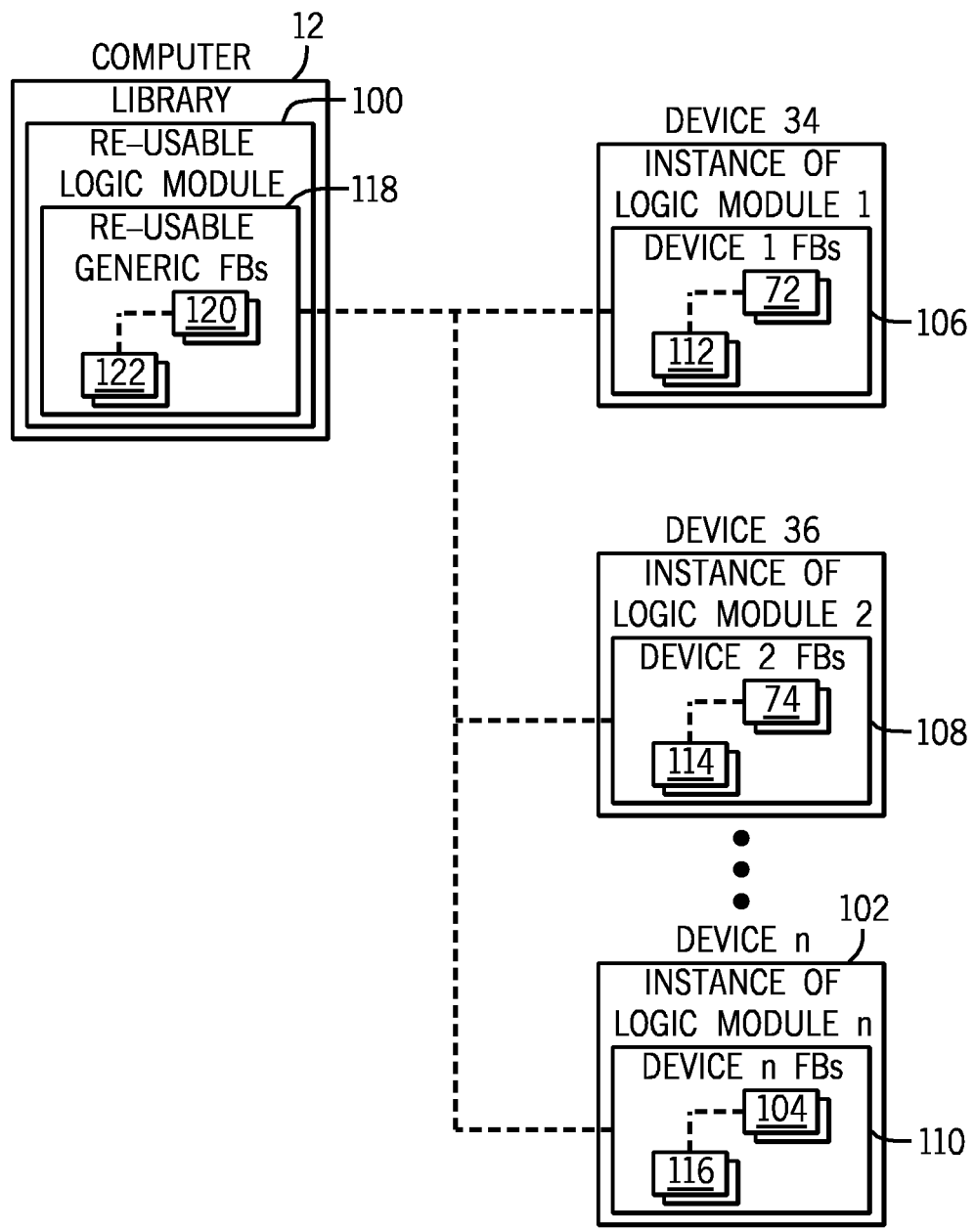
FIG. 2 is a block diagram including embodiments of various components of the industrial control system of FIG. 1.

FIG. 2 is a block diagram illustrating an embodiment of a library 100 that may be used to store, manipulate, and disseminate information with one or more field devices, such as the field devices 34, 36, 38, and 40 shown in FIG. 1. The library 100 may be implemented as executable code instructions stored on a non-transitory tangible computer-readable medium, such as the volatile or non-volatile memory 16 of the computer 12. In the depicted embodiment, the library 100 is shown communicatively coupled to three field devices, the device 34, the device 36, and a device n indicated as 102. It is to be understood that the library 100 may be communicatively coupled to any number of field devices, for example, through the networks 28, 48, and/or 50 shown in FIG. 1.

Advantageously, the library 100 may be used to enable a faster, more efficient configuration of the field devices 34, 36, and 102. In one example, the library 100 may be used for instantiating the field devices 34, 36, and 102. In instantiation, the user, such as the controls engineer or commissioning engineer, may select certain function blocks 72, 74, and 104 for execution by the field device 34, 36, and 102, respectively. Indeed, the user may program one or more control loops or modules 106, 108 and 110 having the selected function blocks 72, 74 and 104. For example, a device placeholder (e.g., virtual device) may be presented by a configuration screen and selected by the user to enter configuration information related to the device (e.g., device 34, 36, or 102), such as the selected function blocks 72, 74 and 104. Once the device is physically connected to the system 10, the configuration information may be automatically loaded into the device's memory. The device may then execute the computer instructions or control logic included in the instantiated function blocks 72, 74 and 104. However, each function block 72, 74 and 104 may contain, for example, instanced information (e.g., attributes and/or variables) 112, 114, and 116 associated with the respective field devices (e.g., devices 34, 36, 102). More specifically, the instanced information may include information used by instantiation procedures liking the function block 72, 74 and 104 to respective devices 34, 36, and 102. For example, the instanced information 112, 114, and 116 may contain input and output identification information uniquely identifying the field devices 34, 36, and 102, respectively (e.g., device tags, channel I/O, port I/O, segment I/O). The instanced information 112, 114, and 116 may also contain calibration information (e.g., default calibration values, ranges), and other variables useful in instantiating or otherwise commissioning the devices 34, 36, and 102 into the systems 10. Manually entering the instanced information 112, 114, and 116 may be laborious and inefficient.

The library 100 enables the creation of hierarchical information, including a reusable logic module or control information 118 suitable for re-use by the devices 34, 36, and 102. For example, the control information 118 may include reusable, generic function blocks 120. The generic function blocks 120 may include computer instructions suitable for execution in a number of field devices that include support for certain function block specifications, such as a function block specification used by the Fieldbus Foundation Function Block Application Process (FBAP), available from the Fieldbus Foundation organization, of Austin, Tex. A non-inclusive list of function block types may include resource blocks, display blocks, AI blocks, AO blocks, discrete input blocks, discrete output blocks, diagnostic blocks, multiple analog input blocks, multiple analog output blocks, PID control blocks, enhanced PID control blocks, advanced PID control blocks, arithmetic blocks, splitter blocks, signal characterizer blocks, integrator blocks, analog alarm blocks, input selector blocks, setpoint ramp generator blocks, timer and logic blocks, lead lag blocks, output signal selector and dynamic limiter blocks, density blocks, constant blocks, custom blocks, flow transducer blocks, and/or flip-flop and edge trigger blocks.

A manufacturer of each of the devices 34, 36, and 102 may provide computer instructions or control logic compliant with the aforementioned function block types and the function block specification (e.g., Fieldbus Foundation specification). The reusable control information 118 of the library 100 may include similar computer instructions or control logic also compliant with the aforementioned function block types and the function block specification (e.g., Fieldbus Foundation specification). Accordingly, the user may configure the reusable control information or control loop 118 once, and the reusable control information may then be configured and/or instanced as the control logic or control loops 106, 108, and 110 executable by the devices 34, 36, and 102. Indeed, the library 100 enables the reusable control information 118 to be provided to one or more field devices, including the depicted devices 34, 36, and 102, as many times as desired. Such re-use of control logic may reduce configuration time and result in a more efficient commissioning of the field devices 34, 36, and 102.

As mentioned before, the function blocks 72, 74 and 104 may include instanced information 112, 114, and 116 corresponding to specific field devices, such as the field devices 34, 36, and 102. For example, the instanced information 112, 114, and 116 may be used by the function blocks 72, 74 and 104 to identify and communicate with the depicted field devices 34, 36, and 102, to calibrate the devices 34, 36, and 102, and/or to generally commission the devices 34, 36, and 102. While the user may manually enter the instanced information 112, 114, and 116 during configuration of the respective function blocks 72, 74, 104, this may be inefficient, time consuming, and may lead to inadvertent data entry errors. In one embodiment, the library 100 enables the use of and attribute substitution method with attribute substitution information 122 included in the reusable control information 118, as described in more detail with respect to FIG. 9. Indeed, the attribute substitution information 122 may be provided by the library 100, suitable for use as a placeholder for later substitution of certain values, thus becoming the instanced information 112, 114, and 116. That is, the attribute substitution information 122 may then be replaced with desired values (e.g., I/O values, calibration values, commissioning values). The desired values transform the attribute substitution information 122 into the instanced information 112, 114, and 116, as described in more detail below.

Figure 3:
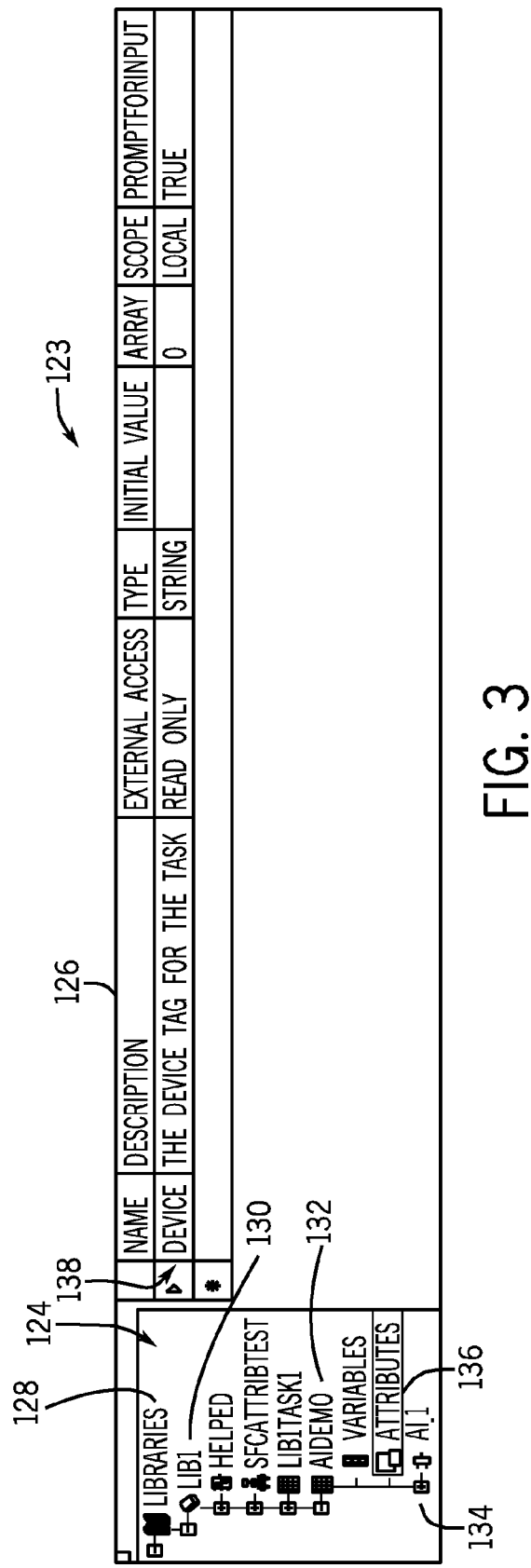
FIG. 3 is a screen view of an embodiment of a treeview control useful in defining the library of FIG. 1.

FIG. 3 is a screen view 123 of an embodiment of a treeview control 124 and a grid control 126 that may be used to define the reusable control logic 118, including the attribute substitution information 122 associated with the reusable, generic function blocks 120. The screen view 123 may be implemented as executable code instructions stored on a non-transitory tangible computer-readable medium, such as the volatile or non-volatile memory 16 of the computer 12. As mentioned above, by distributing the reusable control logic 118 amongst one or more devices (e.g., devices 34, 36, and 102), and by providing for the attribute substitution information 122, the library 100 may enable a more efficient and faster configuration of field devices. The treeview control 124 and the grid control 126 may be implemented as executable code instructions stored on a non-transitory tangible computer-readable medium, such as the volatile or non-volatile memory 16 of the computer 12.

In the depicted embodiment, the treeview control 124 includes a root node 128 labeled "Libraries," useful in hierarchically organizing the library 100 as a tree node data structure. Other data structures may be provide to organize the library 100, including lists, tables, and graphs (e.g., one-to-many, many-to-many). A child node or sub-library node 130 labeled "Lib1" is also depicted. The sub-library node 130 is a sub-library of the library 100. Indeed, the library 100 may include one or more sub-libraries to better organize the library 100. The sub-library node 130 includes a task node 132 labeled "AIDemo." The sub-libraries may include one or more task nodes, program nodes, and other grouping nodes that group control logic and/or function blocks. For example, the task node 132 includes a function block node 134 labeled "AI_1" The function block node 134 may be, for example, a visual representation of one of the generic function blocks 72, 74 or 104 depicted in FIG. 2, such as the function block 104 (e.g., AI function block 104).

In the illustrated embodiment, the task node 132 includes a child attributes node 136 labeled "Attributes." The attributes node 136 may be a visual representation of the attribute substitution information 122. The child attributes node 136 may be used to list all of the attributes associated with the task node 132. Because the child attributes node 136 is depicted as having been selected by the user, the grid control 126 corresponding to the selected child attribute node 136 is shown. All attributes corresponding to the attributes node 136 may then be displayed as rows of the grid control 126. For example, a device attribute row 138 is shown, labeled "Device." Information included in the device attribute row 138 may be used as a virtual placeholder for the physical device during function block 104 configuration and/or instantiation. For example, the information captured by the device attribute row 138 may include a device name to be used in lieu of the physical device tag (i.e., unique device identification tag). By abstracting the physical device information through the use of the device attribute row 138, the library 100 may enable a faster, less error-prone configuration of the function blocks 72, 74 and 104. For example, in one embodiment, when defining the task node 132 by adding the AI function block node 134, the user is prompted to select certain attribute values, as described in more detail with respect to FIG. 4.

FIG. 4 is a screen view 141 of a grid control 140 including a screen title 142 labeled "Enter the Attribute Instance Values." The screen view 141 may be implemented as executable code instructions stored on a non-transitory tangible computer-readable medium, such as the volatile or non-volatile memory 16 of the computer 12. The grid control 140 and/or similar graphical user interface (GUI) controls may enable the entry of the reusable logic module 118, the reusable generic function blocks 120, and the attribute substitution information 122. For example, when creating the AI function block node 134 shown in FIG. 3, the user may then be prompted to associate the block 134 with a field device. Instead of entering an actual device tag, the user may enter a substitution attribute value, such as the substitution attribute 144 having the value "{Device}." In this way, the AI function block node 134 is configured to use generic attribute information rather than specific device information. A final library 100 definition of the task 132 may then show the AI function block node 134 associated to the substitution attribute 144, as described in more detail below with respect to FIG. 5

FIG. 5 is a screen view 145 of an embodiment of the AI function block 120 of FIG. 2 depicted in a control loop view. The screen view 145 may be implemented as executable code instructions stored on a non-transitory tangible computer-readable medium, such as the volatile or non-volatile memory 16 of the computer 12. The AI function block 120 is shown as including a pin 146 used in connecting the AI function block to a field device that includes analog input functionality (e.g., the field devices 34, 36, 102). The pin 146 is depicted with a label "{Device}". Likewise, a function block identification 148 is depicted with a label "{Device} AI1" to denote the use of the substitution attribute 144 shown in FIG. 4. In this manner, the user is visually appraised that the AI function block 120 is currently referring to the substitution attribute 144 rather than to a physical device. By providing for visual feedback of the use of attributes in control loops, the systems and methods described herein enable the user to quickly build a library of executable control logic, such as the library 100, having function blocks associated to generic devices.

Accordingly, the reusable logic module 118 of the library 100 may be defined without having a priori knowledge of the controllers (e.g., controller 30) and the physical devices (e.g., field devices 34, 36, 102) that may desire to use the reusable logic module 118. Once the function block 120 had been defined, the function block 120 may be re-used by any number of controllers that may be communicatively coupled to the library 100. For example, the controller 30 may instance the reusable generic function block 120 by loading it into memory of the field device 102. During instancing of the function block 120, the controller 30 may prompt for a device tag to associate the function block 120 to a specific field device (e.g., devices 34, 36, 102), as described in more detail below with respect to FIG. 6. By re-using the generic function block 120 and acquiring the information suitable for associating the function block 120 to a specific field device during instantiation, the controller 30 may be more easily and quickly configured.

FIG. 6 is a screen view 149 illustrating an embodiment of a grid control 150 used in associating an instance or copy of the function block 120 with a device tag 152 labeled "FFAI1000." The device tag 152 uniquely identifies a field device. The screen view 149 may be implemented as executable code instructions stored on a non-transitory tangible computer-readable medium, such as the volatile or non-volatile memory 16 of the computer 12. As mentioned above, the controller 30 may create an instance of the function block 120 by copying the function block into memory of a device, such as the device 102 shown in FIG. 2. The resulting instance is then shown as the function block 104. It is to be understood that the function block 120 (and reusable logic module 118) may be copied from the library 100 any number of times by any number of controllers, such as the controller 30. The grid control 150 may provide the device tag 152 that may then be used to associate with a physical field device (e.g., device 102). In this way, the instantiation of the function block 120 into the function block 104 may associate the function block 104 with a device tag (e.g., device tag 152). A control loop may then display the updated device tag 152 in the function block 104, as described in more detail below with respect to FIG. 7.

FIG. 7 is a screen view 155 illustrating an embodiment of the AI function block 104 of FIG. 2 depicted in a control loop view. The screen view 155 may be implemented as executable code instructions stored on a non-transitory tangible computer-readable medium, such as the volatile or non-volatile memory 16 of the computer 12. The AI function block 104 is depicted after instantiation of the function block 120 into the device 102. That is, the function block 120 may be copied into memory of the device 102 and instantiated, thus becoming the function block 104. As depicted, a pin 154 is now labeled "FFAI1000" to reflect the association of the function block 104 with the device tag 152 shown in FIG. 6. Likewise, a function block identification 156 is now labeled "FFAI1000AI1." The device tag 152 may then be used to communicate with the device 102. In one embodiment, an automation tool may be used to link the device tag 152 to the desired field device (e.g., device 102), as described in more detail with respect to FIG. 8 below.

Figure 8:
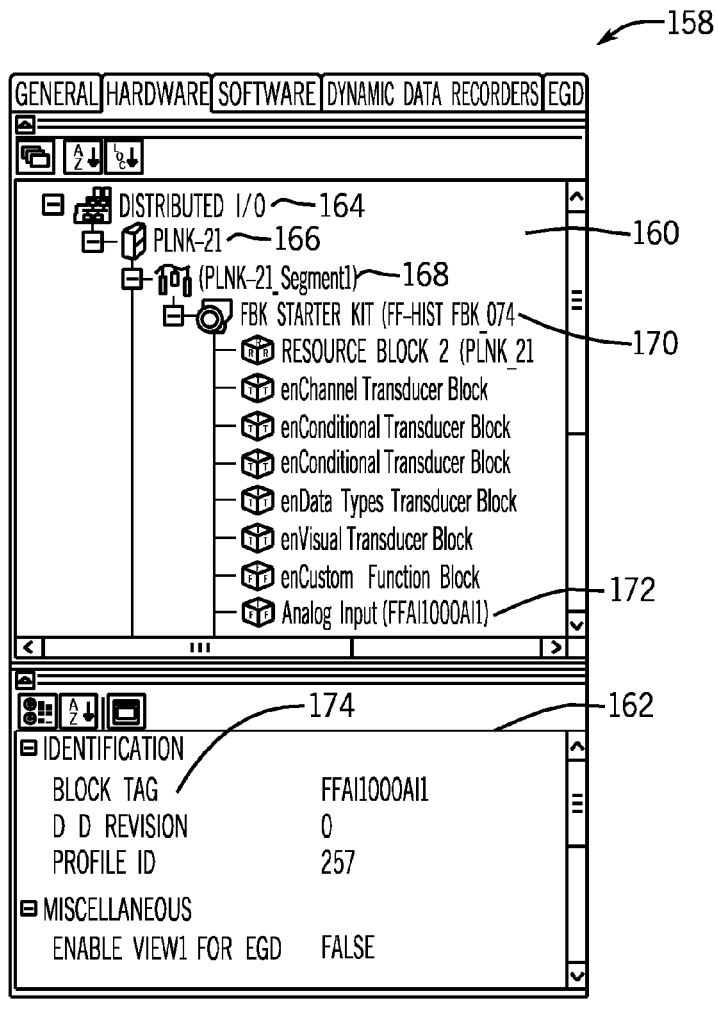
FIG. 8 is a screen view of an embodiment of an automation tool suitable for entering function block information.

FIG. 8 is a screen view of an embodiment of an automation tool 158, including a treeview control 160 and a grid control 162 suitable for linking the device tag 152 to a physical field device, such as the field device 102 depicted in FIG. 2. The automation tool 158 may be implemented as executable code instructions stored on a non-transitory tangible computer-readable medium, such as the volatile or non-volatile memory 16 of the computer 12. By linking or otherwise associating the device tag 152 to the field device 102, the instanced function block 104 shown in FIGS. 2 and 7 may be used in the desired field device 102. In the depicted embodiment, the treeview control 160 includes a root node 164 labeled "Distributed I/O" representing hardware that may be attached, for example, to the controller 30. The root node 164 includes a linking device node 166 that may be representative of a linking device, such as the linking device 46 shown in FIG. 1. The segment port 62 of the linking device 46 is then shown as a child segment node 168. Because the field device 102 may be connected to the segment 62, the field device 102 is depicted as a child field device node 170 of the segment node 168. Likewise, an AI function block node 172 may be used to visually represent the function block 104 instantiated in the field device 102.

The grid control 162 is depicted to include a block tag 174 labeled "FFAI1000AI1." The block tag 174 uniquely identifies a function block (e.g., function block 104) and provides a mechanism to communicate with the identified function block. In one embodiment, the grid control 162 may be used to enter various properties for the function block node 172, and may be used to link or associate the device tag 152 shown in FIG. 6 to the block tag 174. Other techniques may be used to link or associate the device tag 152 to the block tag 174, such as right clicking on the node 172 to enter the linking information, and providing a menu for the linking information. Search tools may also be provided to automatically search certain device tags, (e.g., device tag 152) and link or associate the device tag to the block tag 174. By providing for various systems useful in linking for linking the device tag 152 to a physical field device, the systems and methods described herein enable an efficient re-use of the substitution control logic 118.

Figure 9:
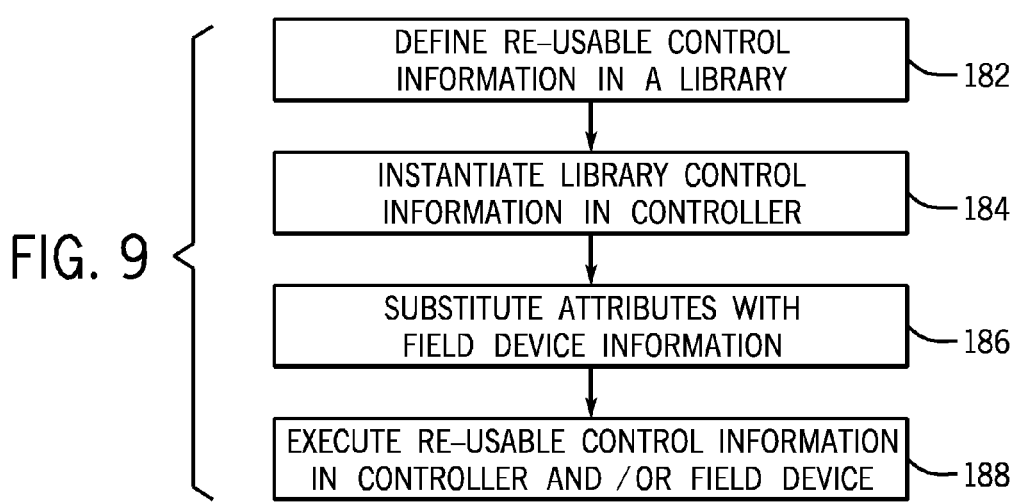
FIG. 9 is a flow chart of an embodiment of a process for re-using library information.

FIG. 9 is a flowchart depicting an embodiment of a process 180 suitable for re-using the control logic 118 in one or more field devices, including the devices 34, 36, and 102 shown in FIG. 2. The process 180 may be implemented as executable code instructions stored on a non-transitory tangible computer-readable medium, such as the volatile or non-volatile memory 16 of the computer 12. In the depicted embodiment, reusable control information, such as the reusable logic module 118, reusable generic function blocks 120, and substitution I/O information 122 shown in FIG. 2, may be defined in a library, e.g., library 100, (block 182). As mentioned above, the screen views 123 and 141 of FIGS. 3 and 4 may be used to define the library 100 (block 182).

The defined, reusable control information 118 may then be instantiated in a controller (block 184), such as the controller 30. For example, the reusable control information 118 may be copied into the memory 42 of the controller 30. Certain information included in the reusable control information 118, such as the substitution I/O information 122, may then be substituted with actual field device (e.g., field device 34, 36, 38, 40, 100) information (block 186). For example, attribute information (e.g., generic device) may be substituted with physical information (e.g., device tag) linking or associating a desired function block to a desired field device. In one embodiment, an automation tool, such as the automation tool 158 shown in FIG. 8, may be used to substitute the substitution I/O information 122. The substituted information (e.g., instanced information 112, 114, 116) may then enable the execution of the logic modules, e.g., logic modules 106, 108, 110 (block 188). By providing for reusable control logic 118 that may be easily and efficiently instantiated into executable control logic 106, 108, and 110, the systems and methods described herein enable a more efficient configuration and/or commissioning of the field devices 34, 36, 38, 40 and/or 102.

Technical effects of the invention include the re-use of a reusable control logic, including reusable, generic function blocks, in one or more field devices and controllers. During configuration of a specific field device, the generic function block may be copied or instanced into the specified field device. Attributes associated with the generic function blocks may be substituted with, for example, device tags uniquely identifying a specific field device. In this manner, a function block tag uniquely identifying the instanced function block may be linked to the device tag uniquely identifying the field device. The attribute substitution may be automated by the use of an automation tool suitable for replacing attribute information with device-specific information.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method, comprising:
defining, via a computer of a system, a reusable control information and a substitution information in a library, wherein the reusable control information comprises a function block and the substitution information comprises at least one attribute enabled during instantiation of the function block, and wherein the at least one attribute comprises a device tag placeholder;
enabling a user to enter the device tag placeholder before commissioning, wherein the device tag placeholder is representative of a physical device tag and of a second physical device tag;
instantiating the reusable control information in a controller;
substituting, only during commissioning of a field device and a second field device, the at least one attribute included in the substitution information with field device identification information comprising a first physical device tag uniquely identifying the field device and a second physical device tag uniquely identifying the second field device, wherein the first physical device tag and the second physical device tag are inputted by a user after prompting from the controller only during the commissioning, wherein the instantiating the reusable control information in the controller comprises copying the function block included in the reusable control information into a memory included in the controller and wherein copying the function block included in the reusable control information into the memory included in the controller comprises linking the field device to a function block tag configured to identify the function block.

2. The method of claim 1, wherein the function block comprises at least one of a display block, an analog input (AI) block, an analog output (AO) block, a discrete input block, a discrete output block, a diagnostic block, a multiple analog input block, a multiple analog output block, a proportional-integral-derivative (PID) control block, an enhanced PID control block, an advanced PID control block, an arithmetic block, a splitter block, a signal characterizer block, an integrator block, an analog alarm block, an input selector block, a setpoint ramp generator block, a timer and logic block, a lead lag block, an output signal selector and dynamic limiter block, a density block, a constant block, a custom block, a flow transducer block, or a flip-flop and edge trigger block.

3. A non-transitory tangible computer-readable medium comprising executable code, the executable code comprising instructions for:
defining, via a computer of a system, a reusable control information and a substitution information in a library, wherein the reusable control information comprises a function block and the substitution information comprises at least one attribute enabled during instantiation of the function block, and wherein the at least one attribute comprises a device tag placeholder;
enabling a user to enter the device tag placeholder before commissioning, wherein the device tag placeholder is representative of a physical device tag and of a second physical device tag;
instantiating the reusable control information in a controller as an executable control logic;
substituting, only during commissioning of a field device and a second field device, the at least one attribute included in the substitution information with field device identification information comprising a first physical device tag uniquely identifying the field device and a second physical device tag uniquely identifying the second field device, wherein the first physical device tag and the second physical device tag are inputted by a user after prompting from the controller only during the commissioning, wherein the instantiating the reusable control information in the controller comprises copying the function block included in the reusable control information into a memory included in the controller and wherein copying the function block included in the reusable control information into the memory included in the controller comprises linking the field device to a function block tag configured to identify the function block.

4. The non-transitory tangible computer-readable medium of claim 3, wherein the executable control logic comprises instructions configured to execute in the field device, or the controller, or a combination thereof.

5. The non-transitory tangible computer-readable medium of claim 3, wherein the instructions for substituting the at least one attribute included in the substitution information with the field device identification information uniquely identifying the field device comprise instructions for substituting the device tag placeholder with a device tag information provided by the user.

6. A system comprising:
a hardware processor configured to execute a library configured to store reusable executable control information comprising a function block and a substitution information, wherein the substitution information comprises at least one attribute enabled during instantiation of the function block, and wherein the at least one attribute comprises a device tag placeholder; and
a controller configured to:
enable a user to enter the device tag placeholder before commissioning, wherein the device tag placeholder is representative of a physical device tag; and
instantiate the reusable executable control information in a memory of a field device and to associate the substitution information with the field device only during commissioning of the field device, wherein the controller is configured to substitute the device tag placeholder with a field device identification information comprising a first physical device tag uniquely identifying the field device inputted by a user only during the commissioning of the field device, wherein the controller is configured to instantiate the reusable executable control information in a second memory of a second field device and to associate the substitution information with a second field device only during commissioning of the second field device, wherein the controller is configured to substitute the device tag placeholder with a second field device identification information comprising a second physical device tag uniquely identifying the second field device inputted by a user only during the commissioning of the second field device, wherein the controller is configured to instantiate the reusable control information by copying the function block included in the reusable control information into a third memory included in the controller and wherein copying the function block included in the reusable control information into the third memory included in the controller comprises linking the field device to a function block tag configured to identify the function block.

7. The system of claim 6, wherein the field device comprises a Fieldbus Foundation field device, a HART field device, a Profibus field device, or a combination thereof, and wherein the hardware processor is configured to graphically display the function block and the device tag placeholder.

8. The system of claim 6, wherein the function block comprises at least one of a display block, an analog input (AI) block, an analog output (AO) block, a discrete input block, a discrete output block, a diagnostic block, a multiple analog input block, a multiple analog output block, a proportional-integral-derivative (PID) control block, an enhanced PID control block, an advanced PID control block, an arithmetic block, a splitter block, a signal characterizer block, an integrator block, an analog alarm block, an input selector block, a setpoint ramp generator block, a timer and logic block, a lead lag block, an output signal selector and dynamic limiter block, a density block, a constant block, a custom block, a flow transducer block, or a flip-flop and edge trigger block.

9. The system of claim 6, wherein the substitution information comprises a device calibration value, a device commissioning value, or a combination thereof.

10. The system of claim 6, comprising an automation tool configured to associate the substitution information with the field device.

11. The system of claim 10, wherein the automation tool is comprises a treeview control, a grid control, or a combination thereof, configured to associate the substitution information with the field device.

12. The system of claim 10, wherein the controller comprises the automation tool.

13. The system of claim 6, comprising a linking device, a high speed Ethernet network, and a Foundation H1 network, wherein the linking device is configured to link the high speed Ethernet network to the Foundation H1 network, and the field device is attached to the Foundation H1 network.

14. The system of claim 6, comprising a human-machine interface (HMI) system, a manufacturing execution system (MES), a distributed control system (DCS), a supervisor control and data acquisition (SCADA) system, or a combination thereof, having the library.

15. The system of claim 6, comprising a turbine system having the field device.

* * * * *